United States Patent Office 3,010,352
Patented Nov. 28, 1961

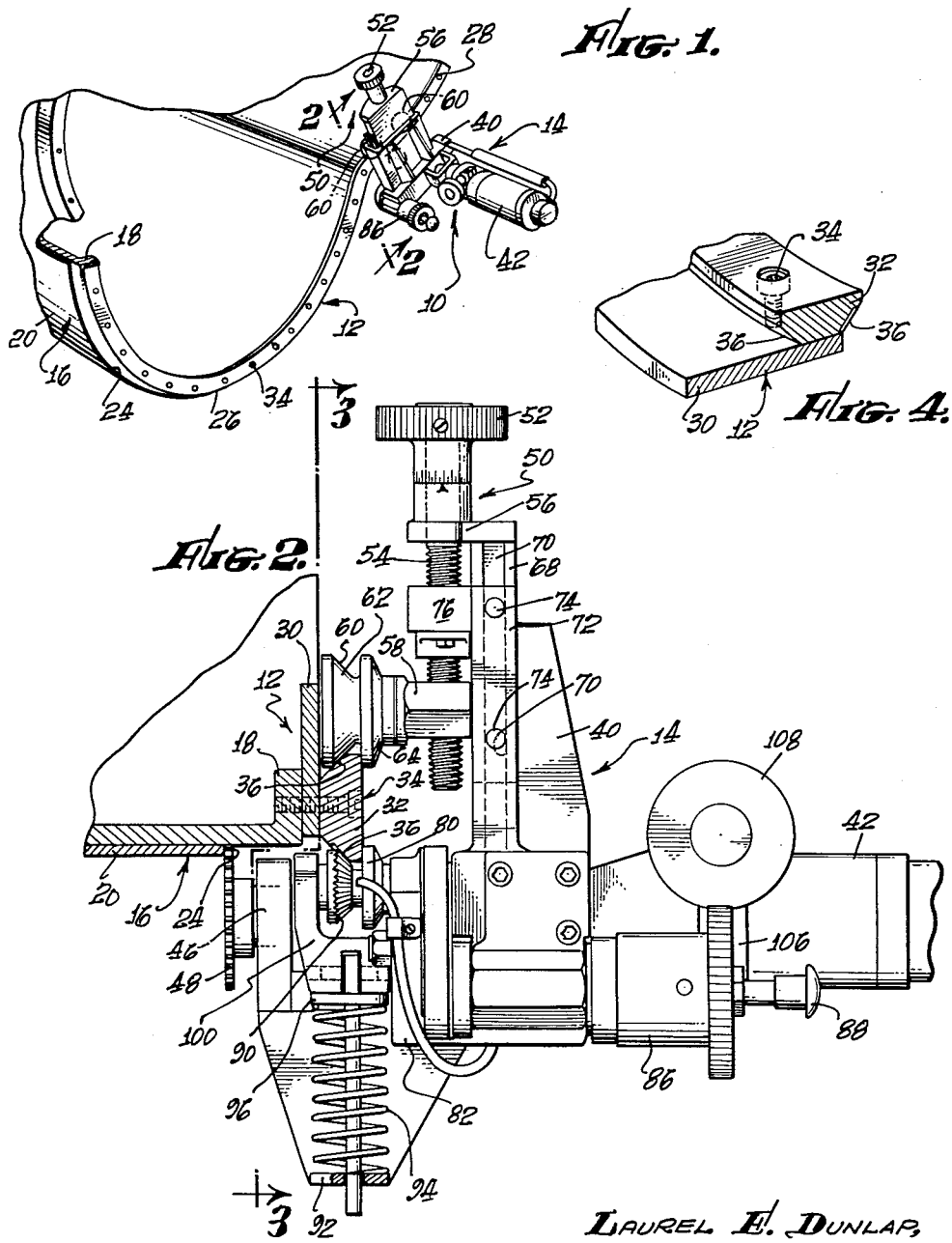

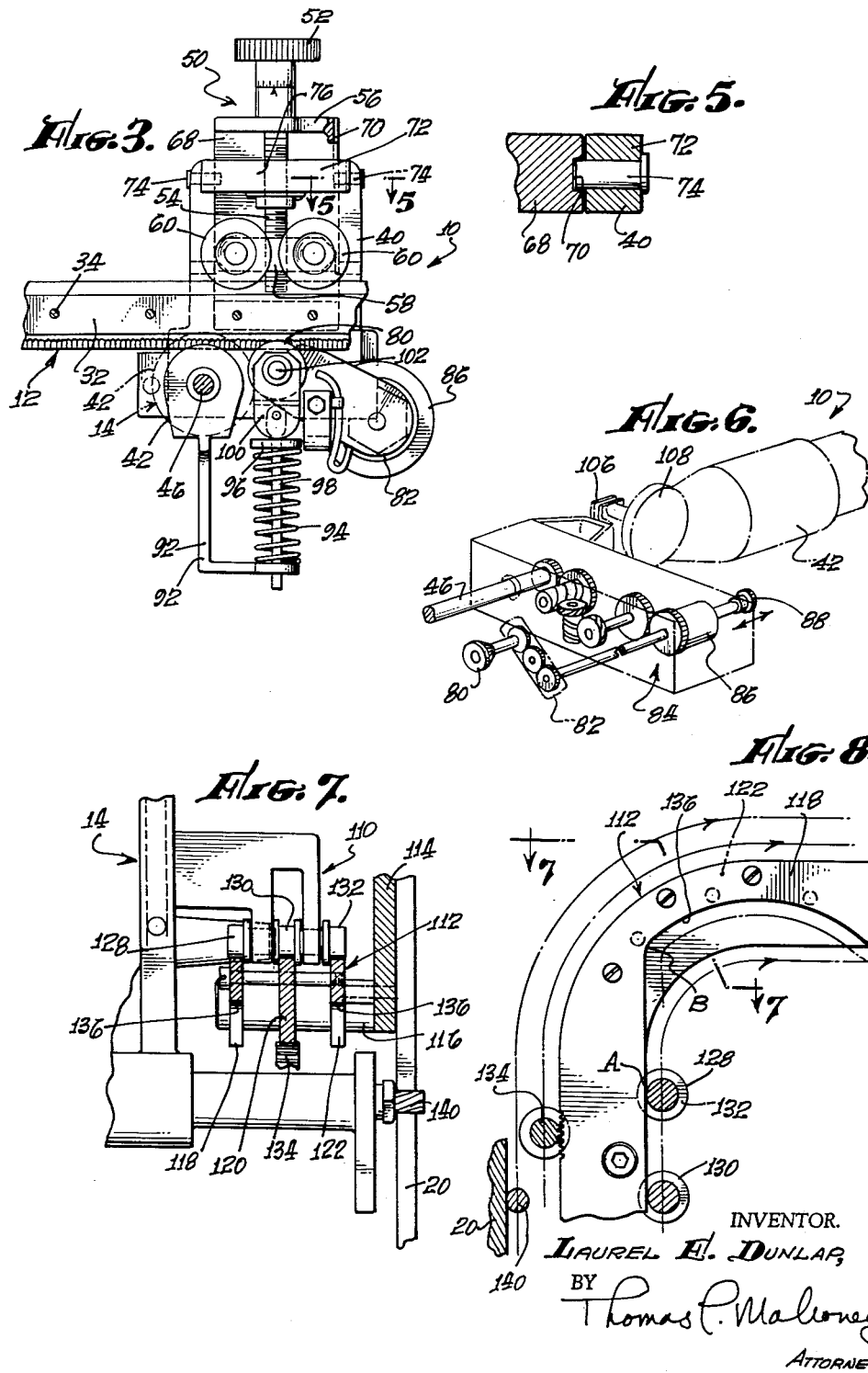

3,010,352
TEMPLATE GUIDED TRIMMING APPARATUS
Laurel E. Dunlap, 4510 Mary Ellen Ave.,
Sherman Oaks, Calif.
Filed Feb. 24, 1958, Ser. No. 717,204
1 Claim. (Cl. 83—483)

This invention relates to a cutting apparatus adapted to be utilized in removing a portion of the surface sheet or skin of an aircraft structure so that the edge of the surface sheet or skin may be properly trimmed to a predetermined configuration.

It is well known to those skilled in the art that during the fabrication of the fuselage sections of aircraft it frequently happens that the surface skin of the aircraft constituted by aluminum sheets is somewhat longer or more irregular than specified in the drawings. Therefore, in order to mate the section with an adjacent section, it is necessary to remove the excess surface sheet or skin in order that a proper butt joint be made with the skin of the adjacent section to be mated with the section under consideration.

In the past, the operation of trimming the edges of the surface sheet or skin has been a hand operation entailing the services of a large number of workers over a prolonged period of time. The time consumed is, of course, in direct proportion to the fact that the trimming must be done meticulously and conform to precise specifications.

In addition to the trimming of the edges of the surface sheets or skins of aircraft fuselage sections prior to their being mated to each other, it is frequently necessary to trim a large aperture or opening so that the skin adjacent the opening may be properly contoured and cut to a predetermined relationship with the underlying structure of the aircraft. This task has also been, prior to the development of the invention under consideration here, a handcraft task involving the meticulous removal of the excess skin by routers, shears, or similar hand held tools.

It is, therefore, an object of my invention to provide a cutting apparatus adapted to be utilized to trim or cut the edges of the surface sheets or skins of an aircraft fuselage whether said edges be located adjacent access openings, window openings, door openings, or the like.

Another object of my invention is the provision of an apparatus of the aforementioned character which includes two primary elements, namely: a track which serves both as a guide and a support and which is adapted to be affixed to the portion of the aircraft at which the cutting operation is to take place and which is of substantially the same configuration as the contour of the skin edge which is to be trimmed or cut, and a cutting head adapted to be mounted on said track.

For instance, if the skin at the extremity of a fuselage section is to be trimmed to cut it back a predetermined distance, the supporting and guide track is configured to the cross section of the fuselage and is secured to the bulkhead or other member underlying the skin in order that the cutting head associated with the track will travel around the track and actually cut the skin overlying the bulkhead.

A further object of my invention is the provision of an apparatus of the aforementioned type wherein the cutting head is provided with a plurality of supporting rollers and with at least one drive roller adapted to engage the track and to automatically carry the cutting head around the track as the cutter mounted in the cutting head engages and trims or shears the skin of the aircraft to the predetermined dimension. Thus, the necessity for the use of hand labor is eliminated and the entire cutting operation can be accomplished in much less time wtih large savings in the cost of the operation. In addition, of course, the resultant trimming or cutting job can be accomplished within much closer tolerances than possible with the hand labor operations. For instance, on a job that previously took thirty-four hours for one man to accomplish, the apparatus of my invention takes six minutes with thirty minutes set-up time.

Another object of my invention is the provision of an apparatus of the aforementioned character wherein the track includes angularly oriented supporting and retaining surfaces which prevent the separation of the cutting head from operative relationship with the track as it is driven thereabout. An associated object of my invention is the provision of a cutting head with incorporates a knurled drive roller adapted to engage the adjacent surface of the track and to form a corresponding knurl therein in order that slippage between the cutting head and the surface of the track engaged by the drive roller may be eliminated.

When the apparatus is applied to curves of relatively large radius, such as the curves encountered in a cross section of fuselage when the end of the skin of the fuselage section is trimmed, they can be readily handled by the provision of a track engaged by all of the supporting and driving rollers. However, when it is desired to cut the surface skin adjacent a window or similar opening wherein the curves at the corners of the window or opening are of relatively small radius, I provide a track which is generally shaped to the configuration of the opening to be cut but which includes a plurality of rails engaged by the supporting and drive rollers or wheels. However, at the corners of the openings the cross section of at least two of the rails is materially reduced, permitting the cutting head to traverse the corners without binding upon the track or causing stalling of the cutting head.

Other objects and advantages of my invention will be apparaent from the following specification and the accompanying drawings which are for the purpose of illustration only and in which:

FIG. 1 is a perspective view showing the manner in which the cutting apparatus of the invention can be utilized to trim the edge of a skin adjacent one extremity of an aircraft fuselage section;

FIG. 2 is a vertical, sectional view taken on the broken line 2—2 of FIG. 1;

FIIG. 3 is a side elevational view taken from the broken line 3—3 of FIG. 2;

FIG. 4 is a transverse, sectional view of the guide and supporting track of one embodiment of the invention;

FIG. 5 is a transverse, sectional view taken on the broken line 5—5 of FIG. 3;

FIG. 6 is a schematic view showing the manner in which the various components of the cutting head are energized;

FIG. 7 is a generally schematic view showing an alternative form of track construction utilized where sharp or small radius curvatures are encountered; and FIG. 8 is an enlarged, fragmentary, schematic view showing the relationship of the drive and supporting rollers of the cutting head and a track of the character shown in FIG. 7.

Referring to the drawings and particularly to FIGS. 1–6 thereof, I show a cutting apparatus 10 which includes, generally, a guiding and supporting track 12 and a cutting head 14 adapted to traverse said track. In describing the construction of the apparatus of the invention and the operation thereof, reference will be made to particular applications in the aircraft manufacturing industry, that is, to the cutting and trimming of the surface sheets or skins of aircraft at appropriate locations thereupon. However, it should be understood that the application of the apparatus of the invention is not intended to be limited to this particular environment since it is conceivable that the apparatus be utilized to trim various types of structures in the same manner as utilized to trim the surface skins of aircraft.

In FIG. 1 of the drawings, the apparatus is shown as associated with one extremity of an air craft fuselage section 16, said section being shown in a fragmentary fashion but being generally oval in cross-sectional configuration. At the extremity of the fuselage section there is located a bulkhead 18 which is overlaid by the surface skin 20 of the section. Such fuselage sections are manufactured as separate components and are subsequently, after being completely assembled, joined or mated with one another, the mating operation usually being accomplished in a jig or fixture, not shown, and the securement of the sections to one another being attained by fasteners passed through openings, not shown, in abutting bulkheads such as the bulkhead 18.

However, since sheet metal fabrication is not always accurate, it frequently happens that the surface skin 20 and, more particularly, the extremity 24 thereof overlying the bulkhead 18 is too long to permit a proper butting relationship to be established with the surface skin of an adjacent section and it is necessary to trim the extremity 24 of the surface skin to a proper dimension prior to accomplishing the mating of two adjacent sections.

As previously indicated, the trimming of the extremity of the skin 20 was accomplished by a hand operation entailing the services of a large number of workmen for a long period of time and when so accomplished the trimming frequently resulted in an uneven joint between the adjacent extremities of abutting skin areas on mating sections.

In applying the apparatus 10 of the invention to an extremity of a fuselage section such as the section 16, the guiding and supporting track is first formed into a basic configuration conforming substantially to the cross-sectional configuration of the fuselage section 16. In other words, if the cross section of the fuselage section 16 is oval, the track 12 is formed to said configuration and the same size as the bulkhead 18 which generally defines the cross-sectional configuration of the fuselage section 16. As pointed out previously, in the fuselage section 16 the cross section is a modified oval including a lower, narrower portion 26 and an expanded, larger portion 28 and, in this case, the track 12 is so formed.

The track 12, as best shown in FIGS. 2 and 4 of the drawings, includes a bed plate 30 formed from steel or similar metal and a rail 32, the rail 32 and bed plate 30 being secured in operative relationship with each other by means of bolts 34 and being secured to the bulkhead 18 by said bolts secured in the openings in the bulkhead.

It will be noted that the rail 32 is of generally frusto-conical configuration and is provided with inclined supporting and guiding surfaces 36 which taper inwardly toward the adjacent surface of the bed plate 30. I have found that a 45° angle, plus or minus 3°, is the most effective angle for these surfaces, for reasons which will become apparent below.

Operatively engageable with the rail 32 of the track 12 and constituting a part of the apparatus 10 is the cutting head 14, said cutting head including a frame 40 upon which is supported an air motor 42. Although an air motor 42 is described as being supported on the frame 40 of the cutting head 14, it is obvious that another form of motive power such as an electric motor, or the like, may be substituted therefor.

Operatively connected to the air motor 42, as best shown in FIG. 6 of the drawings, is a drive shaft 46 which is connected to an appropriate cutting tool such as a saw 48 which is located, as best shown in FIG. 2 of the drawings, in proximity to the extremity 24 of the skin 20 in order that said skin may be trimmed to the predetermined dimension.

The frame 40 of the cutting head 14 includes micrometer adjusting means 50 whereby the cutter 48 is drawn into the skin 20 at the point to be trimmed, said cutter adjusting means including a conventional micrometer knob 52 which controls the rotation of a micrometer screw 54.

The frame 40 includes spaced brackets 56 and 58 which respectively support the upper and lower extremities of the micrometer screw 54. In addition, the lower bracket 58 has support and guide wheels 60 mounted thereupon, said support and guide wheels having inclined surfaces for engagement with and corresponding to the inclined surface 36 on the rail 32. Moreover, the supporting and guide wheels 60 incorporate guide collars 64 which, as best shown in FIG. 2 of the drawings, engage the outer surface of the rail 32 to maintain the wheels 60 is predetermined spatial relationship with the rail 32. Because of the 45° angle of the surfaces 36 of the rail 32 and the corresponding angle on the wheels 60, intimate engagement between these surfaces is achieved so that optimum traction and accuracy may be obtained.

Formed integrally with, or otherwise operatively secured to, the bracket 56 is a guide block 68 incorporating vertically oriented guideways 70 in the opposite edges thereof. Mounted in operative relationship with the guideways 70 is a carriage 72 constituting the major portion of the frame 40 and having guide pins 74 operatively associated therewith and engaged in the guideways 70.

The upper extremity of the carriage 72 mounts a transversely oriented, laterally extending bracket 76 in which the intermediate portion of the micrometer screw 54 is threadedly engaged so that, as the micrometer knob 52 is rotated in the appropriate direction, the carriage 72 is raised or lowered. Since the carriage 72 mounts the air motor 42 and the cutter 48 driven thereby, vertical movement of the carriage 72 in an upward direction, as viewed in FIG. 2 of the drawings, will obviously cause the air motor 42 and the associated cutter 48 to be urged upwardly into contiguity with the skin 24 which is to be trimmed. Thus, the relationship of the cutter 48 with the edge of the skin 20 to be trimmed can be controlled within precise limits.

A drive wheel 80 is mounted upon the carriage 72 by means of a pivotally supported arm 82 and is adapted to be driven by the air motor 42 by means of a gear train, generally indicated at 84 in FIG. 6 of the drawings. A clutch 86 is interposed in the gear train and appropriate movement of the control knob 88 thereof will cause the clutch to be engaged or disengaged, thus causing rotation or cessation of rotation of the drive wheel 80. It will be noted that the drive wheel 80 is provided with an inclined, serrated face 90 which, as best shown in FIG. 2 of the drawings, is adapted to engage the similarly inclined face 36 of the rail 32 and to form similar serrations in the rail 32 during its transit about the rail. Therefore, if the skins of the fuselage section are to be cut, the rail 32 may be mounted upon said sections and the inter-engaging serrations of the drive wheel 80 and the rail will prevent slippage as the cutting head 14 traverses the rail.

A bracket 92 depends below the carriage 72 and is secured to the lower extremity thereof, said bracket serving as a seat for the lower extremity of a compression spring 94 whose upper extremity is engaged upon the head 96 of a rod 98 which is pivotally connected to a link 100 secured to the drive wheel 80 at the one extremity of the shaft 102 therefor.

As best shown in FIGS. 2 and 6 of the drawings, a clamp 106 secures the air motor in operative relationship with the carriage 72 and is adapted to be released by rotation of a turn wheel 108 in order that the motor 42 may be shifted to the left or the right, as viewed in FIG. 2 of the drawings, to locate the cutter 48 in an appropriate position with respect to the edge 24 of the skin 20 to be cut.

Utilizing the apparatus 10 of the invention, it is, of course, first necessary to form the track 12 to the appropriate configuration. This, of course, means shaping both the bed plate 30 and the rail 32 with sufficient accuracy to cause said rail 32 and bed plate 30 to conform substantially to the cross-sectional configuration of the fuselage section upon which the track 12 is to be mounted. When the track 12 has been so formed, it can then be secured to the bulkhead 18 by means of appropriate fasteners 34 which engage corresponding openings in the bulkhead 18, as best shown in FIG. 2 of the drawings.

After the track 12 has been secured in operative relationship with the associated extremity of the fuselage section 16, the cutting head 14 of the apparatus 10 can then be mounted in operative relationship with the track. This may be accomplished in two ways: either by leaving a sufficient space between juxtaposed extremities of the track 12 to permit the supporting and drive wheels 60 and 80 to be inserted in contiguous relationship with the inclined surfaces 36 of the rail 32, or by depressing the arm 82 upon which the drive wheel 80 is mounted to spread said drive wheel 80 sufficiently to permit the supporting wheel 60 to engage the appropriate surface 36 on the rail 32.

After the cutting head 14 has been so located in operative relationship with the rail 32, the cutter 48 may then be adjusted for depth of cut by rotating the micrometer screw 54 in the appropriate direction. As previously explained, rotation in one direction will cause the carriage 72 to descend and urge the cutter 48 away from the structure of the fuselage section 16, thus reducing the depth of cut made by the cutter 48. Conversely, raising of the carriage 72 will cause the raising of the cutter 48 and cause it to make a deeper cut in the skin 20. Thus, the depth of the cut of the cutter 48 can be adjusted to the thickness of the skin 20 being cut within extremely precise limits. Of course, loosening of the hand wheel 108 will release the clamp 106 to permit the motor 42 to be moved inwardly or outwardly in order that the cutter 48 may be juxtaposed to the proper point on the skin 20 to be cut.

After proper adjustment of the cutter 48 in the above described manner, the motor 42 may be energized to cause immediate rotation of the cutter 48 and the control knob 88 on the clutch 86 moved in the proper direction to engage the clutch and cause the gear train 84 to energize the drive wheel 80. Rotation of the drive wheel 80 will cause the knurled or serrated surface 90 thereof to engage in the surface 36 of the rail 32, causing the cutting head 14 to automatically traverse the rail 32 and sever or trim a predetermined portion of the extremity 24 of the skin 20 to provide a precisely cut butting edge thereupon.

During the movement of the cutting head along the rail 32, the spring 94 continually biases the drive wheel 80 into optimum engagement with the associated surface 36 of the rail 32 and thus insures no slippage or loss of traction between the drive wheel 80 and the surface 36 of the rail 32 will occur.

I thus provide by my invention a cutting apparatus which is adapted to sever the desired portion of a structure with great accuracy and which is adapted to achieve such accuracy by conforming in its path of movement to the configuration of the surface or extremity to be cut. Also characteristic of the invention is the ease with which it may be utilized and adapted to various applications and the manufacturing economies attained by such utilization.

As previously explained, in addition to trimming the skin of an aircraft adjacent one extremity of a fuselage section thereof, the apparatus of the invention may be utilized to trim the aircraft skin about the door, window, and access openings of the aircraft fuselage, a task which has been previously a hand operation because of the relatively sharp radii encountered at the corners of said door, window, and access openings.

As previously mentioned, the track 12 utilized in the above described embodiment of the apparatus does not permit the cutting head 14 to move around reduced radius corners and, in order to accomplish the movement of the cutting head 14 around such small radii corners, the modified suspension 110 illustrated schematically in FIGS. 7 and 8 of the drawings and the modified track construction 112 have been adopted. Furthermore, the use of a track of this character achieves extreme accuracy in profile cutting.

In this embodiment of the invention, the track 112 includes a bed plate 114 having a plurality of spacer bars 116 mounted thereupon. The spacer bars 116 support a plurality of rails 118, 120, and 122 in spaced relationship with each other. Mounted in operative relationship with the rails 118, 120, and 122, respectively, are wheels or rollers 128, 130, and 132. A serrated drive wheel or roller 134 engages the opposite side of the rail 120 from that engaged by the roller 130.

As best shown in FIG. 8 of the drawings, the intermediate rail 120 is of constant cross section as it traverses the small radius corner which approximates the configuration of the corner of the window or other access opening being cut in the fuselage of an aircraft, while the outside rails 118 and 122 are reduced in vertical cross section, as at 136, as they approach the corner in order that the associated wheels or rollers 128 and 132 may traverse the path indicated in dash lines.

Therefore, as the knurled drive wheel 134 causes the outer supporting wheels 128 and 132, which are located in advance of the intermediate wheel or roller 130, to approach the corner, they will follow the reduced cross section of the rails 118 and 122 to prevent the carriage from binding as it traverses the small radius corners. However, the trailing, intermediate wheel 130 and the drive roller 134 will traverse the constant section intermediate rail 120 and accommodation for any binding action on the suspension system of the cutter head will take place on the outer tracks 118 and 122.

If the modified rail structure were not used, the spring biasing the drive roller 134 would be compressed because, if rollers 128 and 132 followed constant section rails, at point A the cutter 140 would leave the cut and from that point to point B the cut would be inaccurate. It will be noted that, when the roller 130 reaches point A with the cutter 140 opposite said roller, the advance rollers will be located at point B to prevent movement of the cutter 140 from its predetermined path.

Thus, it is possible for the apparatus of my invention to be applied in trimming the edges of skins 20 by the use of a cutter 140, despite the fact that the edges of the skins 20 are juxtaposed to access or other openings in the fuselage which are characterized by having relatively small curvatures at the corners thereof. Thus, the range of application of the apparatus of the invention is relatively wide and it can be used with equal efficiency on large or small radius curvatures.

I claim:

In a skin trimming apparatus for use in trimming the skin of an aircraft fuselage section, the combination of: an elongated track consisting of a plurality of aligned rails disposed in spaced relationship with each other, said track conforming generally to the cross-sectional configuration of said section and being securable thereto and at least one of said rails being of reduced cross section at the corners of said track to facilitate the traversing of said corners by said roller engageable therewith; and a cutting head mounted upon said track and having a plurality of guide rollers engageable with said rails and a drive roller disposed opposite said guide rollers and engageable with one of said rails, said cutting head including a motor for energizing said drive roller and a cutter engageable with said skin to trim the same.

References Cited in the file of this patent

UNITED STATES PATENTS

| | | |
|---|---|---|
| 1,396,993 | Carter | Nov. 15, 1921 |
| 2,172,313 | Young | Sept. 5, 1939 |
| 2,765,482 | Perron et al. | Oct. 9, 1956 |
| 2,769,234 | Young | Nov. 6, 1956 |
| 2,837,973 | Dunlap | June 10, 1958 |
| 2,842,238 | Shaw et al. | July 8, 1958 |